US009825536B2

United States Patent
Tzeng et al.

(10) Patent No.: US 9,825,536 B2
(45) Date of Patent: Nov. 21, 2017

(54) FLYBACK CONVERTER WITH DYNAMIC LIMITS BASED UPON DUTY CYCLE AND POWER PROCESSING METHOD

(71) Applicant: Power Forest Technology Corporation, Zhubei (TW)

(72) Inventors: Ren-Huei Tzeng, Zhubei (TW); Hsien-Yuan Chiang, Zhubei (TW)

(73) Assignee: Power Forest Technology Corporation, Zhubei (TW)

( * ) Notice: Subject to any disclaimer, the term of this patent is extended or adjusted under 35 U.S.C. 154(b) by 0 days.

(21) Appl. No.: 15/010,136

(22) Filed: Jan. 29, 2016

(65) Prior Publication Data

US 2016/0322904 A1    Nov. 3, 2016

(30) Foreign Application Priority Data

Apr. 28, 2015   (TW) .............................. 104113563 A

(51) Int. Cl.
*H02M 3/335* (2006.01)
*H02M 1/00* (2006.01)

(52) U.S. Cl.
CPC ................. *H02M 3/33507* (2013.01); *H02M 2001/0009* (2013.01)

(58) Field of Classification Search
CPC ........................................ H02M 3/335–3/338
See application file for complete search history.

(56) References Cited

U.S. PATENT DOCUMENTS

| 5,406,189 | A | * | 4/1995 | Wohlberg | ........... | H02M 1/4216 322/10 |
| 9,548,652 | B2 | * | 1/2017 | Cao | ......................... | H02M 1/32 |

| 2009/0201705 | A1 | | 8/2009 | Murata et al. |
| 2009/0295348 | A1 | | 12/2009 | Tao et al. |
| 2013/0308350 | A1 | | 11/2013 | Huang et al. |
| 2014/0160809 | A1 | * | 6/2014 | Lin .................... H02M 3/33523 363/21.16 |

FOREIGN PATENT DOCUMENTS

| TW | M366243 | 10/2009 |
| TW | 201419740 | 5/2014 |
| TW | I456875 | 10/2014 |

OTHER PUBLICATIONS

Office Action dated Feb. 22, 2016 from corresponding application No. TW 104113563.

* cited by examiner

*Primary Examiner* — Gary L Laxton
*Assistant Examiner* — Peter Novak
(74) *Attorney, Agent, or Firm* — Hauptman Ham, LLP

(57) ABSTRACT

Determine the duty cycle of the pulse width modulation signal to derive the voltage value of the alternating current voltage when the power supply is in the peak power working status. The voltage value of the alternating current voltage is determined as high if the duty cycle of the pulse width modulation signal is lower than the predetermined duty cycle. At this time, the limit detection voltage of the pulse width modulation controller is suppressed to protect the transistor switch, and the power supply can still provide the load apparatus with enough power. The power supply does not need any alternating current voltage detection circuit. The voltage value of the alternating current voltage is derived by determining the duty cycle of the pulse width modulation signal.

11 Claims, 3 Drawing Sheets

FLYBACK CONVERTER WITH DYNAMIC LIMITS BASED UPON DUTY CYCLE AND POWER PROCESSING METHOD

BACKGROUND OF THE INVENTION

Field of the Invention

The present invention relates to a supply apparatus and a processing method, and especially relates to a power supply apparatus and a power processing method.

Description of the Related Art

The power supply provides the load apparatus with power to drive the load apparatus. For some load apparatuses, such as the inkjet printer or the hard disk drive, when the load apparatus is just started or the load of the load apparatus is increased or other special statuses happen, the power supply will enter the peak power working status to output more power temporarily to satisfy the requirement of the load apparatus.

For the conventional power supply, when the conventional power supply enters the peak power working status, no matter what the input alternating current voltage is (usually between 90~264 volts), the limit detection voltage of the pulse width modulation controller will be raised drastically to increase the conduction rate of the pulse width modulation signal to satisfy the power requirement. However, if the input alternating current voltage is high at this time (for example, 264 volts), the transistor switch is suffered from spike. In order to solve this problem, currently the protection circuit is added or the transistor switch having higher voltage resistance is used. But this will increase cost.

SUMMARY OF THE INVENTION

In order to solve the above-mentioned problems, an object of the present invention is to provide a power supply apparatus.

In order to solve the above-mentioned problems, another object of the present invention is to provide a power processing method.

In order to achieve the object of the present invention mentioned above, the power supply apparatus comprises a pulse width modulation controller and a transistor switch. The pulse width modulation controller comprises a limit detection voltage and outputs a pulse width modulation signal. The transistor switch is turned on or turned off according to the pulse width modulation signal. When the power supply apparatus is in a first working status, the limit detection voltage is equal to a first voltage. When a duty cycle of the pulse width modulation signal is not less than a predetermined value and the power supply apparatus switches to a second working status, the limit detection voltage of the pulse width modulation controller is equal to a second voltage. When the duty cycle of the pulse width modulation signal is less than the predetermined value and the power supply apparatus switches to the second working status, the limit detection voltage of the pulse width modulation controller is less than the second voltage.

Moreover, the power supply apparatus is applied to a load apparatus electrically connected to the power supply apparatus. The power supply apparatus provides the load apparatus with a power to drive the load apparatus.

Moreover, the power supply apparatus further comprises a transformer, a secondary side diode and an output side capacitor. The transformer comprises a primary side winding and a secondary side winding. The primary side winding is electrically connected to the transistor switch. The secondary side diode is electrically connected to the secondary side winding. The output side capacitor is electrically connected to the secondary side diode. When the transistor switch is turned on, the primary side winding stores an energy, so that a primary side current flowing through the primary side winding and the transistor switch is increased. When the transistor switch is turned off, the energy stored in the transformer is released to the output side capacitor through the secondary side winding and the secondary side diode.

Moreover, the power supply apparatus further comprises a rectifying circuit electrically connected to the primary side winding. The power supply apparatus is applied to an alternating current voltage supply apparatus electrically connected to the power supply apparatus. The alternating current voltage supply apparatus sends an alternating current voltage to the power supply apparatus. The rectifying circuit rectifies the alternating current voltage to obtain a rectified voltage. The rectifying circuit sends the rectified voltage to the primary side winding.

Moreover, when the power supply apparatus is in the first working status, the power supply apparatus outputs a normal power. When the power supply apparatus is in the second working status, the power supply apparatus outputs a peak power. The peak power is greater than the normal power.

Moreover, when the load apparatus is just started or a load of the load apparatus is increased, the power supply apparatus enters a peak power working status. The load apparatus is, for example but not limited to, a motor type electronic apparatus. The predetermined value is, for example but not limited to, 33%.

Moreover, the power supply apparatus further comprises a detection resistor electrically connected to the pulse width modulation controller and the transistor switch. The primary side current flows through the detection resistor to generate a detection voltage. The pulse width modulation controller detects the detection voltage. When the detection voltage is greater than the limit detection voltage, the pulse width modulation controller turns off the transistor switch.

More, when the duty cycle of the pulse width modulation signal is less than the predetermined value and the power supply apparatus switches to the second working status, the limit detection voltage of the pulse width modulation controller is equal to the first voltage.

In order to achieve the object of the present invention mentioned above, the power processing method is applied to a power supply. The power supply comprises a pulse width modulation controller and a transistor switch. The pulse width modulation controller outputs a pulse width modulation signal to the transistor switch to turn on or turn off the transistor switch. The power processing method comprises following steps. When the power supply is in a peak power working status, the pulse width modulation controller determines a duty cycle of the pulse width modulation signal. When the power supply is in the peak power working status and the pulse width modulation controller determines that the duty cycle of the pulse width modulation signal is less than a predetermined duty cycle, the pulse width modulation controller is configured to control that a limit detection voltage of the pulse width modulation controller is less than a peak limit detection voltage.

Moreover, the power processing method is applied to a load apparatus electrically connected to the power supply. The power supply provides the load apparatus with a power to drive the load apparatus.

Moreover, the power supply further comprises a transformer. The transformer comprises a primary side winding and a secondary side winding. The primary side winding is electrically connected to the transistor switch. When the transistor switch is turned on, the primary side winding stores an energy, so that a primary side current flowing through the primary side winding and the transistor switch is increased.

Moreover, the power supply further comprises a secondary side diode and an output side capacitor. The secondary side diode is electrically connected to the secondary side winding. The output side capacitor is electrically connected to the secondary side diode. When the transistor switch is turned off, the energy stored in the transformer is released to the output side capacitor through the secondary side winding and the secondary side diode.

Moreover, the power processing method is applied to an alternating current voltage supply apparatus electrically connected to the power supply. The alternating current voltage supply apparatus sends an alternating current voltage to the power supply. The power supply further comprises a rectifying circuit electrically connected to the primary side winding. The rectifying circuit rectifies the alternating current voltage to obtain a rectified voltage. The rectifying circuit sends the rectified voltage to the primary side winding.

Moreover, when the power supply is in a normal working status, the power supply outputs a normal power. When the power supply is in the peak power working status, the power supply outputs a peak power. The peak power is greater than the normal power.

Moreover, when the load apparatus is just started or a load of the load apparatus is increased, the power supply enters the peak power working status. The load apparatus is, for example but not limited to, a motor type electronic apparatus. The predetermined duty cycle is, for example but not limited to, 33% conduction.

Moreover, the power supply further comprises a detection resistor electrically connected to the pulse width modulation controller and the transistor switch. The primary side current flows through the detection resistor to generate a detection voltage. The pulse width modulation controller detects the detection voltage. When the detection voltage is greater than the limit detection voltage, the pulse width modulation controller turns off the transistor switch.

Moreover, when the power supply is in the peak power working status and the pulse width modulation controller determines that the duty cycle of the pulse width modulation signal is not less than the predetermined duty cycle, the pulse width modulation controller is configured to increase the limit detection voltage of the pulse width modulation controller as the peak limit detection voltage.

Moreover, when the power supply is in a normal working status, the limit detection voltage of the pulse width modulation controller is a normal limit detection voltage. When the power supply is in the peak power working status and the pulse width modulation controller determines that the duty cycle of the pulse width modulation signal is less than the predetermined duty cycle, the pulse width modulation controller is configured to keep the limit detection voltage of the pulse width modulation controller as the normal limit detection voltage.

The advantage of the present invention is that when the power supply is in the peak power working status, the duty cycle of the pulse width modulation signal is determined to obtain a voltage value of the alternating current voltage. If the duty cycle of the pulse width modulation signal is less than a predetermined value, the voltage value of the alternating current voltage is determined as high. At this time, the limit detection voltage of the pulse width modulation controller is suppressed to protect the transistor switch, and the power supply still can provide the load apparatus with enough power. The power supply does not need any alternating current voltage detection circuit because the voltage value of the alternating current voltage is obtained by determining the duty cycle of the pulse width modulation signal.

DETAILED DESCRIPTION OF THE INVENTION

Please refer to following detailed description and figures for the technical content of the present invention. The following detailed description and figures are referred for the present invention, but the present invention is not limited to it.

Figure 1:
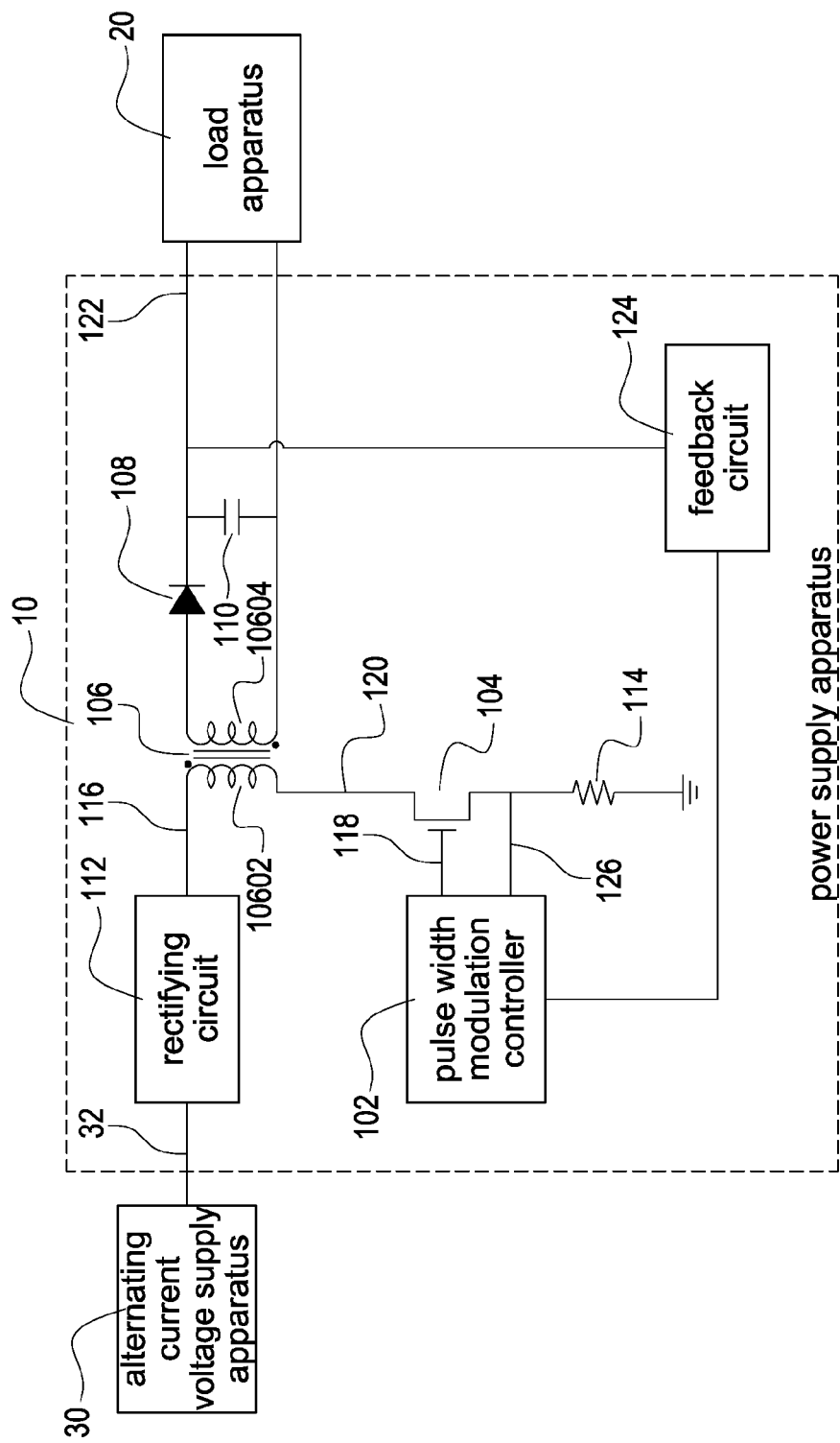
FIG. 1 shows a block diagram of the power supply apparatus of the present invention.

FIG. 1 shows a block diagram of the power supply apparatus of the present invention. This embodiment is, for example but not limited to, a flyback power converter. A power supply apparatus 10 is applied to a load apparatus 20 and an alternating current voltage supply apparatus 30. The power supply apparatus 10 comprises a pulse width modulation controller 102, a transistor switch 104, a transformer 106, a secondary side diode 108, an output side capacitor 110, a rectifying circuit 112, a detection resistor 114 and a feedback circuit 124. The transformer 106 comprises a primary side winding 10602 and a secondary side winding 10604.

The load apparatus 20 is electrically connected to the power supply apparatus 10. The alternating current voltage supply apparatus 30 is electrically connected to the power supply apparatus 10. The transistor switch 104 is electrically connected to the pulse width modulation controller 102. The primary side winding 10602 is electrically connected to the transistor switch 104. The secondary side diode 108 is electrically connected to the secondary side winding 10604. The output side capacitor 110 is electrically connected to the secondary side diode 108. The rectifying circuit 112 is electrically connected to the primary side winding 10602. The detection resistor 114 is electrically connected to the pulse width modulation controller 102 and the transistor switch 104. The feedback circuit 124 is electrically connected to the pulse width modulation controller 102, the secondary side diode 108 and the output side capacitor 110.

The main technical features of the present invention are as following. The pulse width modulation controller 102 comprises a limit detection voltage and outputs a pulse width modulation signal 118. The transistor switch 104 is turned on or turned off according to the pulse width modulation signal 118. When the power supply apparatus 10 is in a first working status, the limit detection voltage is equal to a first voltage. When a duty cycle of the pulse width modulation signal 118 is not less than a predetermined value and the power supply apparatus 10 switches to a second working status, the limit detection voltage of the pulse width modulation controller 102 is equal to a second voltage. When the duty cycle of the pulse width modulation signal 118 is less than the predetermined value and the power supply apparatus 10 switches to the second working status, the limit detection voltage of the pulse width modulation controller 102 is less than the second voltage. Following contents will describe (or describe in another point of view of) the main technical features of the present invention mentioned above in detail.

The alternating current voltage supply apparatus 30 sends an alternating current voltage 32 to the rectifying circuit 112 of the power supply apparatus 10. The rectifying circuit 112 rectifies the alternating current voltage 32 to obtain a rectified voltage 116. The rectifying circuit 112 sends the rectified voltage 116 to the primary side winding 10602. The pulse width modulation controller 102 outputs the pulse width modulation signal 118 to the transistor switch 104 to turn on or turn off the transistor switch 104.

When the transistor switch 104 is turned on, the primary side winding 10602 stores an energy, so that a primary side current 120 flowing through the primary side winding 10602 and the transistor switch 104 is increased. When the transistor switch 104 is turned off, the energy stored in the transformer 106 is released to the output side capacitor 110 through the secondary side winding 10604 and the secondary side diode 108. The power supply apparatus 10 provides the load apparatus 20 with a power 122 through the output side capacitor 110 to drive the load apparatus 20.

The load apparatus 20 is, for example but not limited to, a motor type electronic apparatus, such as an inkjet printer or a hard disk drive. When the power supply apparatus 10 is in a normal working status (namely, the first working status mentioned above), the power supply apparatus 10 outputs a normal power. When the load apparatus 20 is just started or a load of the load apparatus 20 is increased (or other special statuses happen), the power supply apparatus 10 is requested to enter a peak power working status (namely, the second working status mentioned above). When the power supply apparatus 10 is in the peak power working status, the power supply apparatus 10 outputs a peak power. The peak power is greater than the normal power to satisfy the start of the load apparatus 20 or the increase of the load of the load apparatus 20 (or other special statuses).

Figure 2:
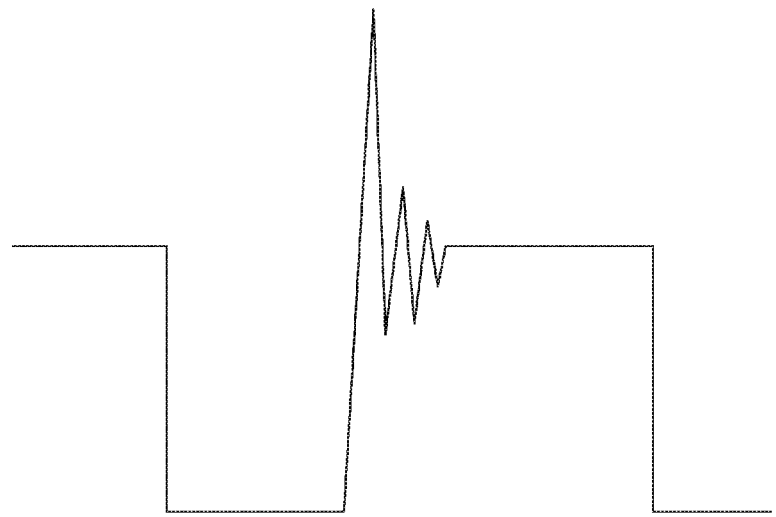
FIG. 2 shows an embodiment of a waveform diagram in microscopic view of the voltage of two sides of the transistor switch.

The transformer 106 has the leakage inductance (not shown in FIG. 1) and the transistor switch 104 has the stray capacitance (not shown in FIG. 1). When the pulse width modulation signal 118 is off, the leakage inductance of the transformer 106 and the stray capacitance will generate the resonance phenomena. The high voltage surge will be generated at two sides of the transistor switch 104, as shown in FIG. 2. FIG. 2 shows an embodiment of a waveform diagram in microscopic view of the voltage of two sides of the transistor switch. From the description mentioned above and FIG. 2, it is well known that when the alternating current voltage 32 is low (for example 90 volts) and the transistor switch 104 is off, the voltage across two sides of the transistor switch 104 is lower. Even if the high voltage surge caused by the leakage inductance is added, the transistor switch 104 can still endure, so that the transistor switch 104 is not broken. But if the alternating current voltage 32 is high (for example 264 volts) and the transistor switch 104 is off, the voltage across two sides of the transistor switch 104 will be higher. At this time, if the high voltage surge caused by the leakage inductance is added, the transistor switch 104 will be easily broken due to the high voltage.

Assume that the withstand voltage of the transistor switch 104 is 600 volts. When the alternating current voltage 32 is low and the power supply apparatus 10 is in the peak power working status, the transistor switch 104 is not suffered from the surge yet (namely, the surge is not over the withstand voltage of the transistor switch 104). But when the alternating current voltage 32 is high and the power supply apparatus 10 is in the peak power working status, the transistor switch 104 will be suffered from the surge easily (namely, the cross-voltage is over the withstand voltage of the transistor switch 104).

The purpose of the present invention is to find out how to protect the transistor switch 104 and satisfy the power requirement of the load apparatus 20 at the same time when the alternating current voltage 32 is high and the power supply apparatus 10 is in the peak power working status. In the present invention, when the power supply apparatus 10 is in the peak power working status, if the alternating current voltage 32 is high, the limit detection voltage of the pulse width modulation controller 102 is suppressed to protect the transistor switch 104 (will be described in detail later).

The present invention does not use any voltage detection circuit to detect the alternating current voltage 32. The present invention determines the duty cycle of the pulse width modulation signal 118 to obtain a voltage value of the alternating current voltage 32. If the duty cycle of the pulse width modulation signal 118 is less than the predetermined value (for example 33%), the voltage value of the alternating current voltage 32 is determined as high.

This is because if the voltage value of the alternating current voltage 32 is higher, its energy is higher, so that the duty cycle can be smaller. Therefore, the voltage value of the alternating current voltage 32 can be obtained by determining the duty cycle of the pulse width modulation signal 118. If the duty cycle of the pulse width modulation signal 118 is less than the predetermined value, the voltage value of the alternating current voltage 32 is determined as high. Moreover, it is also because if the voltage value of the alternating current voltage 32 is higher, its energy is higher (or other conventional methods can be used), so that the present invention can satisfy the power requirement of the load apparatus 20 while the limit detection voltage of the pulse width modulation controller 102 is suppressed.

Following contents will introduce the limit detection voltage. The limit detection voltage is set inside by the pulse width modulation controller 102. In the specification of the pulse width modulation controller 102, it is usually called "Vcs limit", such as 0.8 volts. The limit detection voltage is usually used in over current protection and peak power limitation.

The primary side current 120 flows through the detection resistor 114 to generate a detection voltage 126 (in the specification of the pulse width modulation controller 102, it is usually called "Vcs"). The pulse width modulation controller 102 detects the detection voltage 126. When the detection voltage 126 is greater than the limit detection voltage, the pulse width modulation controller 102 turns off the transistor switch 104.

Figure 3:
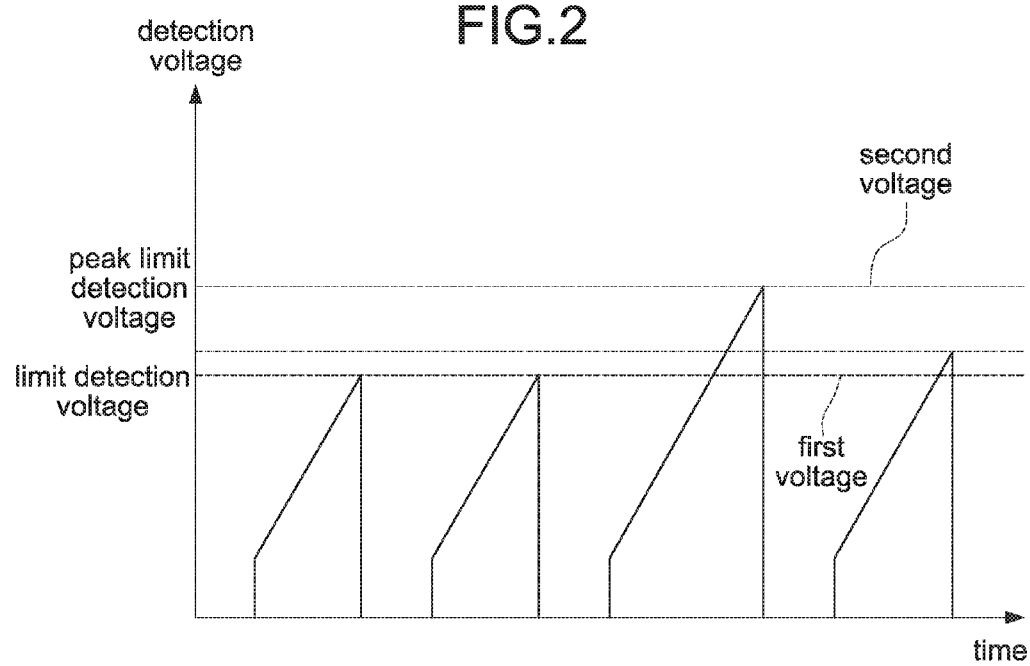
FIG. 3 shows an embodiment of a waveform diagram of the detection voltage.

FIG. 3 shows an embodiment of a waveform diagram of the detection voltage. When from left to right the first and second waveforms encounter the limit detection voltage, the pulse width modulation controller 102 turns off the transistor switch 104. In another word, the limit detection voltage can determine the pulse width modulation signal 118 and the maximum output power of the power supply.

For a conventional power supply, when the conventional power supply enters the peak power working status, no matter what the alternating current voltage 32 is, the limit detection voltage will be increased as a peak limit detection voltage (for example 1.1 volts) to satisfy the power requirement, for example, from left to right the third waveform in FIG. 3. At this time if the alternating current voltage 32 is high, the transistor switch 104 will be suffered from the surge.

When the present invention enters the peak power working status, if the alternating current voltage 32 is low, because the transistor switch 104 is not suffered from the surge yet and in order to satisfy the power requirement, the limit detection voltage will be increased as the peak limit detection voltage (namely, the second voltage mentioned above). But if the alternating current voltage 32 is high, the present invention will suppress the limit detection voltage. For example, suppress the limit detection voltage to be less than the peak limit detection voltage, or keep the limit detection voltage unchanged. This will be described in detail in the following contents.

The limit detection voltage is less than the peak limit detection voltage:

When the power supply apparatus 10 is in the peak power working status, the duty cycle of the pulse width modulation signal 118 is determined by the pulse width modulation controller 102. When the power supply apparatus 10 is in the peak power working status and the pulse width modulation controller 102 determines that the duty cycle of the pulse width modulation signal 118 is less than the predetermined value (namely, the alternating current voltage 32 is high), the pulse width modulation controller 102 is configured to control that the limit detection voltage of the pulse width modulation controller 102 is less than the peak limit detection voltage. For example, from left to right the fourth waveform in FIG. 3, the limit detection voltage is increased slightly but still less than the peak limit detection voltage.

Keep the limit detection voltage unchanged:

When the power supply apparatus 10 is in the normal working status, the limit detection voltage of the pulse width modulation controller 102 is a normal limit detection voltage (namely, the limit detection voltage shown in FIG. 3; the first voltage mentioned above). When the power supply apparatus 10 is in the peak power working status and the pulse width modulation controller 102 determines that the duty cycle of the pulse width modulation signal 118 is less than the predetermined value (namely, the alternating current voltage 32 is high), the pulse width modulation controller 102 is configured to keep the limit detection voltage of the pulse width modulation controller 102 as the normal limit detection voltage, for example, from left to right the first and second waveforms in FIG. 3.

In another word, when the duty cycle of the pulse width modulation signal 118 is less than the predetermined value and the power supply apparatus 10 switches to the second working status, the limit detection voltage of the pulse width modulation controller 102 is equal to the first voltage.

Moreover, in the present invention, when the alternating current voltage 32 is low:

When the power supply apparatus 10 is in the peak power working status and the pulse width modulation controller 102 determines that the duty cycle of the pulse width modulation signal 118 is not less than the predetermined value (namely, the alternating current voltage 32 is low), the pulse width modulation controller 102 is configured to increase the limit detection voltage of the pulse width modulation controller 102 as the peak limit detection voltage, for example, from left to right the third waveform in FIG. 3.

The advantage of the present invention is that when the power supply is in the peak power working status, the duty cycle of the pulse width modulation signal is determined to obtain the voltage value of the alternating current voltage. If the duty cycle of the pulse width modulation signal is less than the predetermined value, the voltage value of the alternating current voltage is determined as high. At this time, the limit detection voltage of the pulse width modulation controller is suppressed to protect the transistor switch, and the power supply still can provide the load apparatus with enough power. The power supply does not need any alternating current voltage detection circuit because the voltage value of the alternating current voltage is obtained by determining the duty cycle of the pulse width modulation signal.

Moreover, the present invention provides a power processing method applied to a power supply. The power supply comprises a pulse width modulation controller and a transistor switch. The pulse width modulation controller outputs a pulse width modulation signal to the transistor switch to turn on or turn off the transistor switch.

The power processing method comprises following steps. When the power supply is in a peak power working status, the pulse width modulation controller determines a duty cycle of the pulse width modulation signal. When the power supply is in the peak power working status and the pulse width modulation controller determines that the duty cycle of the pulse width modulation signal is less than a predetermined duty cycle, the pulse width modulation controller is configured to control that a limit detection voltage of the pulse width modulation controller is less than a peak limit detection voltage.

Moreover, the power processing method is applied to a load apparatus electrically connected to the power supply. The power supply provides the load apparatus with a power to drive the load apparatus. The power supply further comprises a transformer. The transformer comprises a primary side winding and a secondary side winding. The primary side winding is electrically connected to the transistor switch. When the transistor switch is turned on, the primary side winding stores an energy, so that a primary side current flowing through the primary side winding and the transistor switch is increased.

Moreover, the power supply further comprises a secondary side diode and an output side capacitor. The secondary side diode is electrically connected to the secondary side winding. The output side capacitor is electrically connected to the secondary side diode. When the transistor switch is turned off, the energy stored in the transformer is released to the output side capacitor through the secondary side winding and the secondary side diode.

Moreover, the power processing method is applied to an alternating current voltage supply apparatus electrically connected to the power supply. The alternating current voltage supply apparatus sends an alternating current voltage to the power supply. The power supply further comprises a rectifying circuit electrically connected to the primary side winding. The rectifying circuit rectifies the alternating current voltage to obtain a rectified voltage. The rectifying circuit sends the rectified voltage to the primary side winding.

Moreover, when the power supply is in a normal working status, the power supply outputs a normal power. When the power supply is in the peak power working status, the power supply outputs a peak power. The peak power is greater than the normal power. When the load apparatus is just started or a load of the load apparatus is increased, the power supply enters the peak power working status. The load apparatus is, for example but not limited to, a motor type electronic apparatus. The predetermined duty cycle is, for example but not limited to, 33% conduction.

Moreover, the power supply further comprises a detection resistor electrically connected to the pulse width modulation controller and the transistor switch. The primary side current flows through the detection resistor to generate a detection voltage. The pulse width modulation controller detects the detection voltage. When the detection voltage is greater than the limit detection voltage, the pulse width modulation controller turns off the transistor switch.

Moreover, when the power supply is in the peak power working status and the pulse width modulation controller determines that the duty cycle of the pulse width modulation signal is not less than the predetermined duty cycle, the pulse width modulation controller is configured to increase the limit detection voltage of the pulse width modulation controller as the peak limit detection voltage.

Moreover, when the power supply is in a normal working status, the limit detection voltage of the pulse width modulation controller is a normal limit detection voltage. When the power supply is in the peak power working status and the pulse width modulation controller determines that the duty cycle of the pulse width modulation signal is less than the predetermined duty cycle, the pulse width modulation controller is configured to keep the limit detection voltage of the pulse width modulation controller as the normal limit detection voltage.

Figure 4:
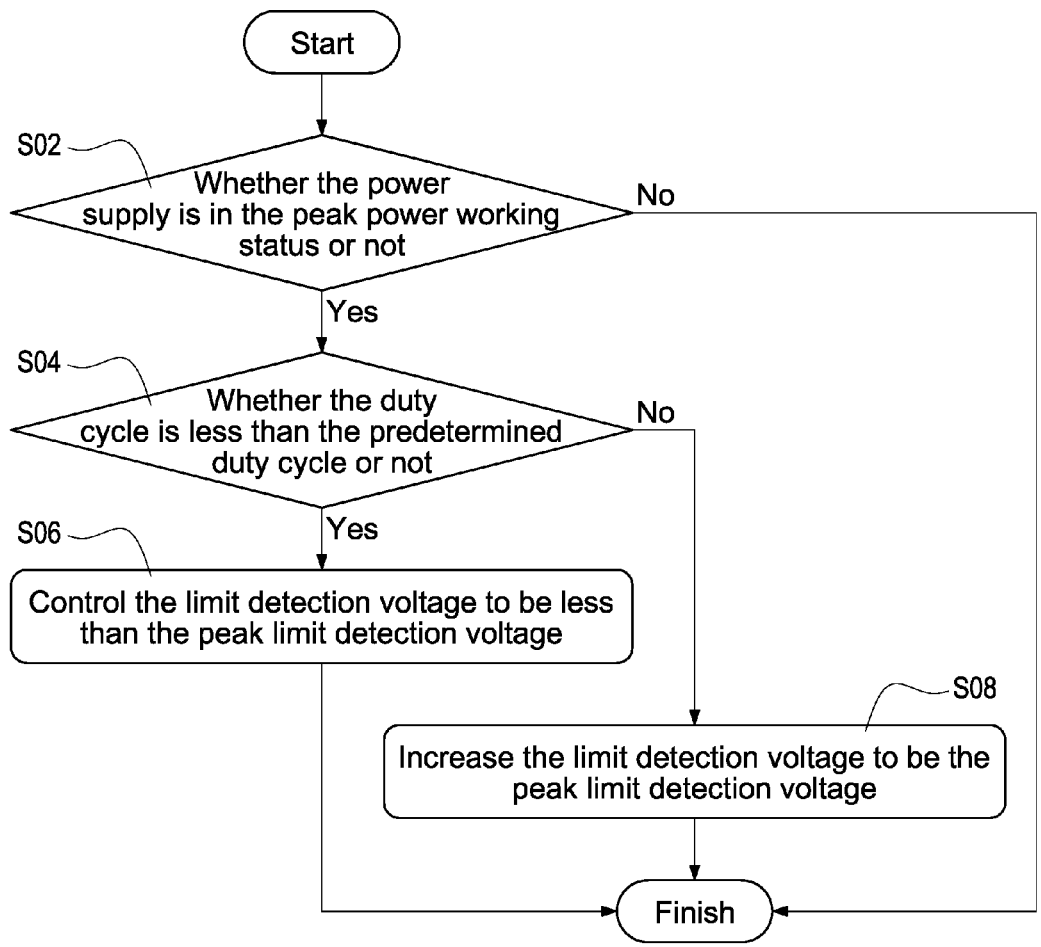
FIG. 4 shows a flow chart of the power processing method of the present invention.

In conclusion, FIG. 4 shows a flow chart of the power processing method of the present invention. The power processing method of the present invention mainly comprises following steps.

Step S02: whether the power supply is in the peak power working status or not. If not, the process is finished. If yes, the process goes to step S04.

Step S04: whether the duty cycle is less than the predetermined duty cycle or not. If not, the process goes to step S08. If yes, the process goes to step S06.

Step S06: control the limit detection voltage to be less than the peak limit detection voltage. Then the process is finished.

Step S08: increase the limit detection voltage to be the peak limit detection voltage. Then the process is finished.

The advantage of the present invention is that when the power supply is in the peak power working status, the duty cycle of the pulse width modulation signal is determined to obtain the voltage value of the alternating current voltage. If the duty cycle of the pulse width modulation signal is less than the predetermined value, the voltage value of the alternating current voltage is determined as high. At this time, the limit detection voltage of the pulse width modulation controller is suppressed to protect the transistor switch, and the power supply still can provide the load apparatus with enough power. The power supply does not need any alternating current voltage detection circuit because the voltage value of the alternating current voltage is obtained by determining the duty cycle of the pulse width modulation signal.

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A flyback converter with dynamic limits based upon duty cycle receiving an alternating current voltage, the flyback converter comprising:
 a pulse width modulation controller configured to provide a limit detection voltage, the pulse width modulation controller being configured to output a pulse width modulation signal;
 a transistor switch configured to be turned on or turned off according to the pulse width modulation signal; and
 a detection resistor electrically connected to the pulse width modulation controller and the transistor switch,
 wherein
  when the flyback converter is in a normal working status, the limit detection voltage is equal to a first voltage,
  when a duty cycle of the pulse width modulation signal is greater than a predetermined value corresponding with the alternating current voltage with a low voltage value, and the flyback converter is operated from the normal working status to a peak power working status, the limit detection voltage of the pulse width modulation controller is equal to a second voltage, the second voltage is greater than the first voltage, and a peak power outputted from the flyback converter in the peak power working status is greater than a normal power outputted from the flyback converter in the normal working status,
  when the duty cycle of the pulse width modulation signal is less than the predetermined value corresponding with the alternating current voltage with a high voltage value, and the flyback converter is operated from the normal working status to the peak power working status, and the limit detection voltage of the pulse width modulation controller is less than the second voltage or equal to the first voltage, the limit detection voltage is set by the pulse width modulation controller,
  the pulse width modulation controller is configured to detect a detection voltage generated by a primary side current flowing through the detection resistor, and
  the pulse width modulation controller turns off the transistor switch when the detection voltage is greater than the limit detection voltage.

2. The flyback converter with dynamic limits based upon duty cycle in claim 1, wherein
 the flyback converter is applied to a load apparatus electrically connected to the flyback converter, and
 the flyback converter provides the load apparatus with a power to drive the load apparatus.

3. The flyback converter with dynamic limits based upon duty cycle in claim 1, further comprising:
 a transformer comprising a primary side winding and a secondary side winding, the primary side winding electrically connected to the transistor switch;
 a secondary side diode electrically connected to the secondary side winding; and
 an output side capacitor electrically connected to the secondary side diode,
 wherein
  when the transistor switch is turned on, the primary side winding stores an energy so that the primary side current flowing through the primary side winding and the transistor switch is increased, and when the transistor switch is turned off, the energy stored in the transformer is released to the output side capacitor through the secondary side winding and the secondary side diode.

4. The flyback converter with dynamic limits based upon duty cycle in claim 2, wherein when the load apparatus is just started or a load of the load apparatus is increased, the flyback converter enters the peak power working status, and the predetermined value is 33%.

5. The flyback converter with dynamic limits based upon duty cycle in claim 3, further comprising:

a rectifying circuit electrically connected to the primary side winding, wherein the flyback converter is applied to an alternating current voltage supply apparatus electrically connected to the flyback converter, the alternating current voltage supply apparatus sends the alternating current voltage to the flyback converter, the rectifying circuit rectifies the alternating current voltage to obtain a rectified voltage, and the rectifying circuit sends the rectified voltage to the primary side winding.

6. A power processing method applied to a flyback converter receiving an alternating current voltage, the flyback converter comprising a pulse width modulation controller and a transistor switch, the pulse width modulation controller outputting a pulse width modulation signal to the transistor switch to turn on or turn off the transistor switch, the power processing method comprising:

a. when the flyback converter is in a peak power working status, the pulse width modulation controller determining a duty cycle of the pulse width modulation signal;

b. when the flyback converter is operated from a normal working status to the peak power working status and the pulse width modulation controller determines that the duty cycle of the pulse width modulation signal is less than a predetermined duty cycle corresponding with the alternating current voltage with a high voltage value, the pulse width modulation controller controlling that a limit detection voltage of the pulse width modulation controller is less than a peak limit detection voltage or equal to a normal limit detection voltage, and when the flyback converter is in the normal working status, the limit detection voltage of the pulse width modulation controller is equal to the a normal limit detection voltage; and c. when the flyback converter is operated from the normal working status to the peak power working status and the pulse width modulation controller determines that the duty cycle of the pulse width modulation signal is greater than the predetermined duty cycle corresponding with the alternating current voltage with a low voltage value, the pulse width modulation controller increasing the limit detection voltage of the pulse width modulation controller to equal the peak limit detection voltage;

wherein the limit detection voltage is set by the pulse width modulation controller, the flyback converter further comprises a detection resistor electrically connected to the pulse width modulation controller and the transistor switch, a primary side current flows through the detection resistor to generate a detection voltage, the pulse width modulation controller detects the detection voltage, and when the detection voltage is greater than the limit detection voltage, the pulse width modulation controller turns off the transistor switch.

7. The power processing method in claim 6, wherein the power processing method is applied to a load apparatus electrically connected to the flyback converter, and the flyback converter provides the load apparatus with a power to drive the load apparatus.

8. The power processing method in claim 6, wherein the flyback converter further comprises a transformer, the transformer comprises a primary side winding and a secondary side winding, the primary side winding is electrically connected to the transistor switch, and when the transistor switch is turned on, the primary side winding stores an energy so that the primary side current flowing through the primary side winding and the transistor switch is increased.

9. The power processing method in claim 7, wherein when the load apparatus is just started or a load of the load apparatus is increased, the flyback converter enters the peak power working status, and the predetermined duty cycle is 33% conduction.

10. The power processing method in claim 8, wherein the flyback converter further comprises a secondary side diode and an output side capacitor, the secondary side diode is electrically connected to the secondary side winding, the output side capacitor is electrically connected to the secondary side diode, and when the transistor switch is turned off, the energy stored in the transformer is released to the output side capacitor through the secondary side winding and the secondary side diode.

11. The power processing method in claim 8, wherein the power processing method is applied to an alternating current voltage supply apparatus electrically connected to the flyback converter, the alternating current voltage supply apparatus sends the alternating current voltage to the flyback converter, the flyback converter further comprises a rectifying circuit electrically connected to the primary side winding, the rectifying circuit rectifies the alternating current voltage to obtain a rectified voltage, and the rectifying circuit sends the rectified voltage to the primary side winding.

* * * * *